United States Patent [19]

Shimo et al.

[11] Patent Number: 4,819,272

[45] Date of Patent: Apr. 4, 1989

[54] INTERMITTENTLY DRIVEN TRANSMITTER

[75] Inventors: Norio Shimo; Norio Numata, both of Tokyo, Japan

[73] Assignee: Sony Corporation, Tokyo, Japan

[21] Appl. No.: 25,626

[22] Filed: Mar. 13, 1987

[30] Foreign Application Priority Data

Mar. 26, 1986 [JP] Japan .................................. 61-67944

[51] Int. Cl.[4] ............................................ H01Q 11/12
[52] U.S. Cl. ...................................... 455/127; 455/6;
455/95; 455/117; 330/202; 330/297
[58] Field of Search ...................... 455/127, 117, 6, 12,
455/95; 330/202, 297; 361/281; 314/135;
340/310 R

[56] References Cited

U.S. PATENT DOCUMENTS

| | | | |
|---|---|---|---|
| 3,437,931 | 4/1969 | Schultz | 455/127 |
| 3,697,886 | 10/1972 | Conn et al. | 455/127 |
| 4,353,037 | 10/1982 | Miller | 455/117 |
| 4,509,199 | 4/1985 | Ichihara | 370/110.1 |

FOREIGN PATENT DOCUMENTS 58-25731  2/1983  Japan .................................. 455/127

*Primary Examiner*—John W. Caldwell, Sr.
*Assistant Examiner*—Tyrone Queen
*Attorney, Agent, or Firm*—Hill, Van Santen, Steadman & Simpson

[57] ABSTRACT

An intermittently driven transmitter having high power output which is driven intermittently so as to transmit a signal via, for example, a satellite in which the voltage supplied to the transmitter is boosted and supplied to a capacitor. When the signal is to be transmitted, the voltage stored on the capacitor is supplied to a constant voltage circuit which generates a constant voltage which is higher than the voltage supplied to the transmitter and which is supplied to a power amplifier in the final stage of the transmitter and, thus, the intermittent type transmitter with a suitable battery drive system is obtained.

7 Claims, 2 Drawing Sheets

INTERMITTENTLY DRIVEN TRANSMITTER

BACKGROUND OF THE INVENTION

1. Field of the Invention

The present invention relates in general to an intermittently operated transmitter which radiates high transmission power and is intermittently driven.

2. Description of the Prior Art

The signal transmission system for transmitting a signal through a satellite, for example, is known comprising a signal transmission system having short duration and high transmission power in which a frequency of 1.6 GHz is used and data is transmitted during a 100 ms period with a transmission of 40 W.

A satellite communication transmitter is known wherein a power amplifying stage or circuit connected to an antenna operates in class "C" mode so as to obtain high power efficiency and has a power supply having a large capacity and in which a voltage as, for example, 30 volts and a current of about 5 amperes is required to drive the power amplifying circuit. See U.S. Pat. No. 4,509,199. In general, with such conventional transmitter when it is driven, a power source voltage supplied to the transmitter is boosted by using a DC-DC converter having a large capacity and a power of 30 volts and 5 amperes which in the above-mentioned example is directly supplied to the power amplifying circuit.

Thus, in the prior art transmitter, described above, the power supply having a large capacity with about 30 volts and 5 amperes is required to drive the power amplifying circuit. Also, a DC-DC converter having a large capacity is required when the power amplifier circuit is driven by the battery.

It may be considered to use a DC-DC converter having a small capacity to charge a capacitor from the battery so as to drive the amplifying circuit, but such drive method has the following defects. When the power amplifying circuit is directly driven by the voltage stored in the capacitor, the voltage drops very rapidly upon operation of the transmitter so that the output power of the power amplifying circuit is difficult to maintain and the power efficiency is low.

SUMMARY OF THE INVENTION

Accordingly, it is an object of this invention to provide an intermittent transmitter which can remove the defects inherent in prior art transmitters.

Another object of the invention is to provide an intermittent transmitter of novel construction in which a power amplifying circuit is driven with a booster circuit such as a DC-DC converter having a small capacity and a capacitor and can provide stable operating characteristics.

It is yet another object of the invention to provide an intermittent transmitter which reduces power losses occurring in a power supply path through which the power is supplied to the power amplifying circuit.

Yet another object of the invention is to provide an intermittent transmitter in which the transmission signal forming circuit supplies a transmission signal to a power amplifying circuit and these circuits can be easily and simply connected.

According to one aspect of the present invention, there is provided an intermittent transmitter which includes a booster circuit for boosting a power source voltage which is supplied to the transmitter and a capacitor which is charged by the voltage boosted by the boosting circuit and a constant voltage circuit which is supplied with power from the capacitor and in which a power amplifying circuit is driven by a constant voltage obtained from the constant voltage circuit with the constant voltage being higher than the voltage supplied to the transmitter and also the voltage boosted by the booster circuit is superimposed upon the transmission signal supplied to the power amplifying circuit and then fed to the power amplifying circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
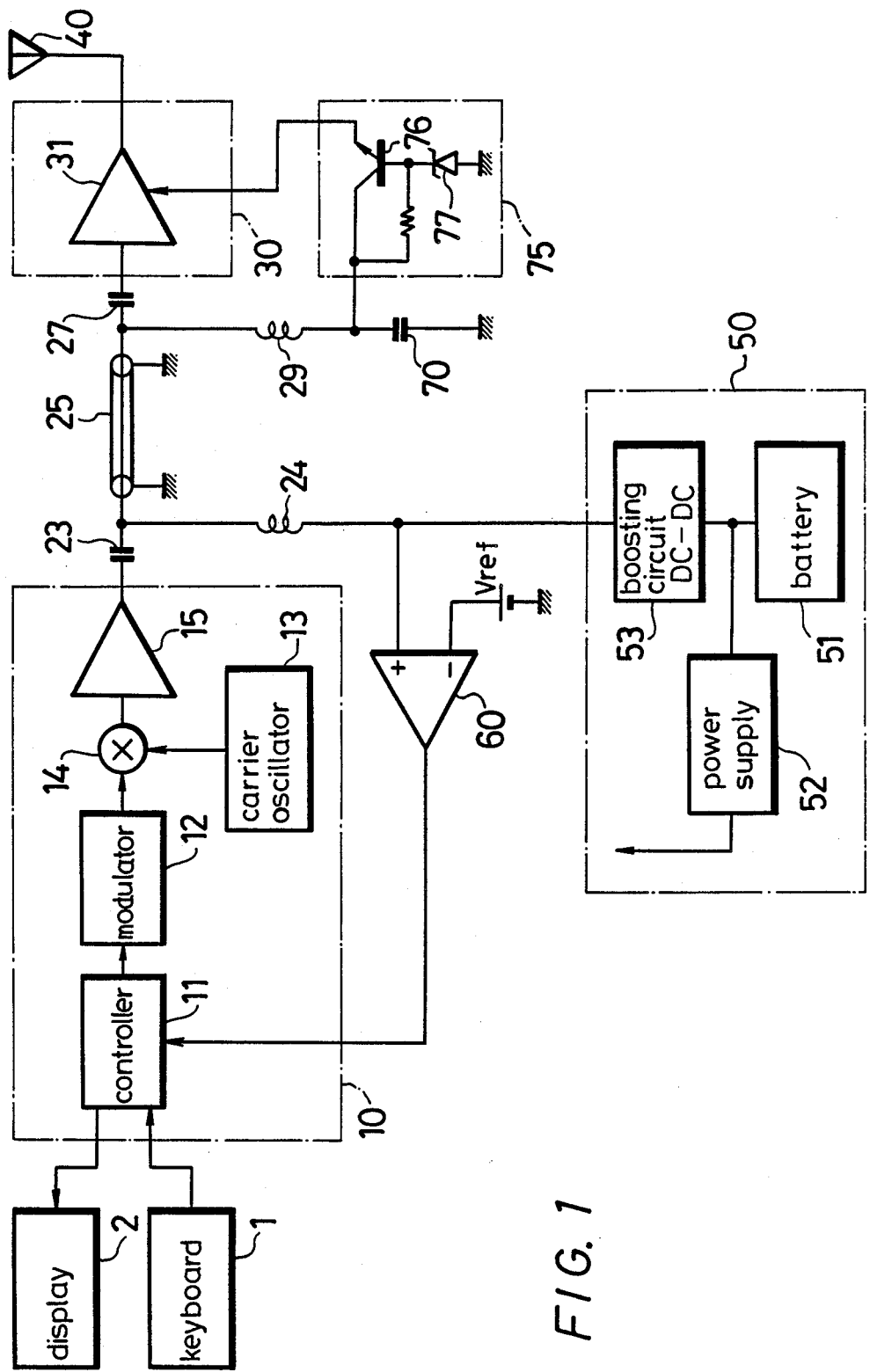
FIG. 1 is a block diagram illustrating an overall circuit arrangement of an embodiment of an intermittent transmitter according to the present invention.

FIG. 1 illustrates an intermittent transmitter according to the present invention. The present invention in this particular embodiment is applied to a mobile type high power transmission transmitter for use in a satellite communication system.

As shown in FIG. 1, the intermittent transmitter of the invention comprises a transmission signal forming circuit 10 for forming the transmission signal and a power amplifying circuit 30 for amplifying and supplying the transmission signal supplied from the transmission signal forming circuit 10 through a coaxial cable 25 used as a signal transmission line to an antenna 40. A power supply 50 phototransmitter is connected as illustrated. The power amplifying circuit 30 may be installed, for example, on the roof of a mobile unit.

In this embodiment, the transmission signal forming circuit 10 connects to a keyboard apparatus 1 so as to input transmission data and control data to the transmitter and a display apparatus 2 is connected so as to indicate various kinds of data and other information. The transmission signal forming circuit 10 comprises a controller 11 for controlling the input and output data and is connected to a modulator 12 which modulates data to be transmitted from the controller 11 to a signal which is modulated in a predetermined modulation manner. A carrier oscillator 13 which generates a carrier having a frequency of, for example, 1.6 GHz supplies an input to a mixer 14 which also receives the output of the modulator 12 and superimposes the modulating signal on the carrier. An amplifier 15 receives the output of the mixer 14 and amplifies the transmission signal. The output terminal of the amplifier 15 is connected through a capacitor 23 which is used for blocking DC signals to one end of a coaxial cable 25. This one end of the coaxial cable is connnected through a choke coil 24 to the output terminal of a boosting circuit 53 which may be formed as a "DC-DC converter" in the power supply 50. The power amplifying circuit 30 is formed of a power amplifier 31 which operates as a class "C" amplifier. The input terminal of the power amplifier 31 is connected through a capacitor 27 which blocks DC signals supplied from the DC-DC converter to the second end of the coaxial cable 25. The output terminal of the power amplifier 31 is connected to the transmitting antenna 40. The output end of the coaxial cable 25 is grounded through a series circuit comprising a choke coil 29 which is used to block the transmission signal and a capacitor 70 which is used to drive the power amplifying circuit 30. The junction between the choke coil 29 and the capacitor 70 is connected through a constant voltage circuit 75 to the power amplifier 31 in the power amplifying circuit 30. The capacitor 27 and the choke coil 29 comprise a signal separator for separating signals.

Figure 2:
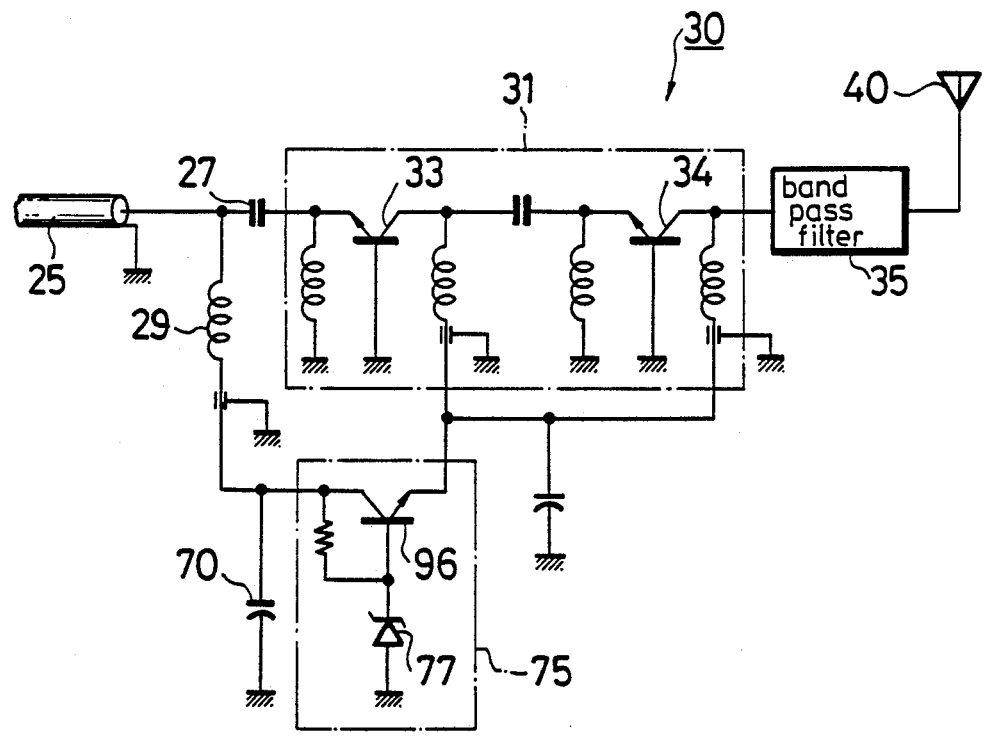
FIG. 2 is a circuit diagram illustrating an example of the power amplifying circuit in the transmitter of the invention.

The power amplifier 31 of the power amplifying circuit 30 is illustrated in FIG. 2 and comprises a two-stage amplifying circuit comprising base grounded type transistors 33 and 34 which have their bases grounded. The output terminal of the power amplifier 31 is connected through a bandpass filter (BPF) 35 which suppresses undesired radiation to the transmitting antenna 40. A matching circuit is not shown in FIG. 2.

FIG. 1 illustrates the power supply 50 which comprises a mobile type battery power source 51 of, for example, 13.8 volts and a power supply 52 which is supplied with the output voltage of the battery power source 51. A DC-DC converter 53 comprises the boosting circuit. The power supply 52 has its output terminal connected to various circuit elements forming the previously mentioned transmission signal forming circuit 10 and provides a relatively low drive voltage from the output voltage of the battery power source 51 for driving the various elements of the transmission signal forming circuit 10. The DC-DC converter 53 increases the output voltage of the battery power source 51 to, for example, about 60 volts. The DC-DC converter 53 has its output terminal connected to the choke coil 24 and to a non-inverting input terminal of a comparator 60 so as to supply a charging current to the capacitor 70 for driving the power amplifying circuit 30 through the coaxial cable 25. The constant voltage circuit 75 has its input terminal connected to the capacitor 70. The constant voltage circuit 75 comprises a transistor 76 with its collector connected to the junction point between the capacitor 70 and the coil 29 and a Zener diode 77 is connected between ground and the base of the transistor 76. The constant voltage circuit 75 forms a drive voltage $V_{dr}$ of about 30 volts, for example, from the voltage appearing on the capacitor 70 and drives the power amplifier 31 as illustrated in FIG. 1.

The comparator 60 detects when the output voltage of the DC-DC converter which is the voltage Vc to which the capacitor 70 has been charged has been boosted to a level higher than a predetermined voltage as, for example, 50 volts. The comparator 60 supplies the detected signal to the controller 11 in the transmission signal forming circuit 10 and the reference voltage $V_{ref}$ is supplied to the inverting input terminal of the comparator 60 from a battery as shown.

Figure 3:
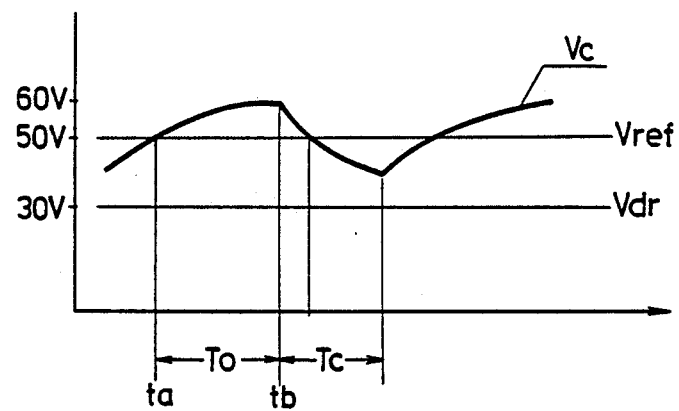
FIG. 3 is a plot of the charging voltage to a capacitor which illustrates how it changes with time in the transmitter of the present invention.

When the signal detected by the comparator 60 is supplied to the controller 11 of the transmission signal forming circuit 10, the controller 11 supplies transmission data of a predetermined length of stored data to the modulator 12 after a predetermined period To as illustrated in FIG. 3 and transmits the transmission signal from the mixing circuit 14 through the amplifier 15. The power amplifier 31 in the power amplifying circuit 30 is supplied with the transmission signal from the transmission forming circuit 10 through the coaxial cable 25, but it does not operate when it is not supplied with the input signal, but accomplishes class "C" operation only when the transmission signal from the transmission signal forming circuit 10 is supplied to it at which time it transmits the transmission signal via the transmitting antenna 40.

In this embodiment, the capacitor 70 which supplies the drive power to the power amplifier 31 in the power amplifying circuit 30 is gradually charged by the DC-DC converter as shown in FIG. 3. The comparator 60 detects when the voltage Vc on the capacitor 70 has been boosted to a level higher than the predetermined voltage. As shown in FIG. 3, during a predetermined period Tc from a time tb with a delay of a predetermined period To from a time ta, the transmission data is supplied from the transmission signal forming circuit 10 to the power amplifying circuit 30 and thus the power amplifier 31 is operated. As a result, the voltage Vc comprising the charge on the capacitor 70 drops. When the transmission signal forming circuit 10 discontinues supplying the transmission signal to the power amplifying circuit 30, the power amplifying circuit 30 stops operation and the capacitor 70 will again be charged and the described operation is repeated each time transmission is to occur.

The time durations of the predetermined period To and Tc are respectively selected to be in a range such that when the power amplifier 31 operates, the voltage Vc to which the capacitor 70 is charged will be prevented from dropping lower than the operating voltage of the constant voltage circuit 75, that is the voltage at which the constant voltage circuit 75 can generate the constant voltage Vdr.

The present invention, when a power amplifier 31 which operates in class "C" is replaced with a power amplifier which operates in class "AB", it is necessary to provide in the power source line a switching circuit which interrupts the supply of drive current to such power amplifier so that no input signal is supplied to it at certain times.

According to the present invention, the intermittent transmitter comprises the boosting circuit so as to boost the power source voltage supplied to the transmitter to a predetermined voltage level, and the capacitor which is charged by the boosted voltage from the boosting circuit and the constant voltage circuit which is supplied with the charging current of the capacitor whereby the constant voltage circuit supplies a voltage with a constant potential higher than the voltage supplied to the transmitter amplifying circuit so as to intermittently drive the transmitter. In other words, the voltage for driving the output amplifying circuit is made a constant voltage from the voltage supplied from the capacitor 70 by the constant voltage circuit and the intermittent transmitter of the invention will provide a stable transmitter output.

Also, in the invention, the transmission signal forming circuit for forming the transmission supplied to the power amplifying circuit and the power amplifying circuit are separated by the transmission line 25 which may be a coaxial cable and the voltage resulting from boosting the voltage supplied to the transmitter is superimposed upon the transmission signal and then fed to the power amplifying circuit. Then the constant voltage is formed by the constant voltage circuit which is connected to the power amplifying circuit which is driven by the constant voltage. Thus, the current flowing through the transmission line comprising coaxial cable in FIG. 1 that connects the transmission signal forming circuit and the power amplifying circuit can be reduced because of the boosted voltage and, thus, power loss (Joule Loss) in the transmission line will be reduced.

Also, since the capacitor 70 is provided at the site of the power amplifying circuit for the transmission signal forming circuit allows the length of path through which a large current flows when the signal is transmitted to be minimized. Thus, the power loss will be reduced due to this fact.

Although the invention has been described with respect to preferred embodiments, it is not to be so limited as changes and modifications and variations could be effected by one skilled in the art without departing from the spirit or scope of the novel concepts of the invention as defined by the appended claims.

We claim as our invention:

1. An intermittent transmitter for intermittently transmitting a signal comprising: a transmission signal forming circuit which forms a signal which is to be transmitted; a power amplifying circuit for amplifying said transmission signal formed by said transmission signal forming circuit; a power source voltage supply, a boosting circuit for boosting the power source voltage from said power source voltage supply to a substantially higher boosted voltage; a capacitor receiving a voltage from said boosting circuit; and a constant voltage circuit connected to said capacitor to receive the voltage stored in said capacitor and generating and regulating a constant voltage output which is higher than said power source voltage but lower than said boosted voltage, wherein said constant voltage output from said constant voltage circuit is supplied to said power amplifying circuit as a power source to intermittently drive said power amplifying circuit.

2. An intermittent transmitter according to claim 1, further comprising a comparator receiving and comparing the voltage from said boosting circuit with a predetermined reference voltage, an output signal of said comparator supplied to said transmission signal forming circuit and said transmission signal forming circuit supplying said transmission signal to said power amplifying circuit.

3. An intermittent transmitter as claimed in claim 2, in which said power amplifying circuit is driven in the class "C" operation mode.

4. An intermittent transmitter for transmitting a signal intermittently comprising: a transmission signal forming circuit which forms a transmission signal to be transmitted; a signal cable, a power amplifying circuit receiving the transmission signal formed by said transmission signal forming circuit through said signal cable and amplifying it, a power source voltage supply supplying a first voltage $V_1$, a boosting circuit for boosting the power source voltage of said power source voltage supply to a substantially higher boosted voltage, a capacitor receiving a voltage from said boosting circuit through said signal cable; and a constant voltage circuit connected to said capacitor to receive the voltage stored in said capacitor and generating and regulating a constant voltage output which is higher than said power source voltage but lower than said boosted voltage, wherein said constant voltage output from said constant voltage circuit is supplied to said power amplifying circuit as a power source to intermittently drive said power amplifying circuit.

5. An intermittent transmitter as claimed in claim 4, in which the transmission signal from said transmission signal forming circuit and the voltage boosted by said boosting circuit are superimposed and supplied to said signal cable.

6. An intermittent transmitter according to claim 4, further comprising a comparator for comparing the voltage from said boosting circuit with a predetermined reference voltage, and a signal produced by said comparator supplied to said transmission signal forming circuit and said transmission signal forming circuit supplying said transmission signal to said power amplifying circuit.

7. An intermittent transmitter as claimed in claim 6, in which said power amplifying circuit is driven in the class "C" operation mode.

* * * * *